Dec. 8, 1953        C. B. BRIGHT        2,661,592
HYDRAULIC DRIVE INTERNAL-COMBUSTION ENGINE
Filed Sept. 17, 1951
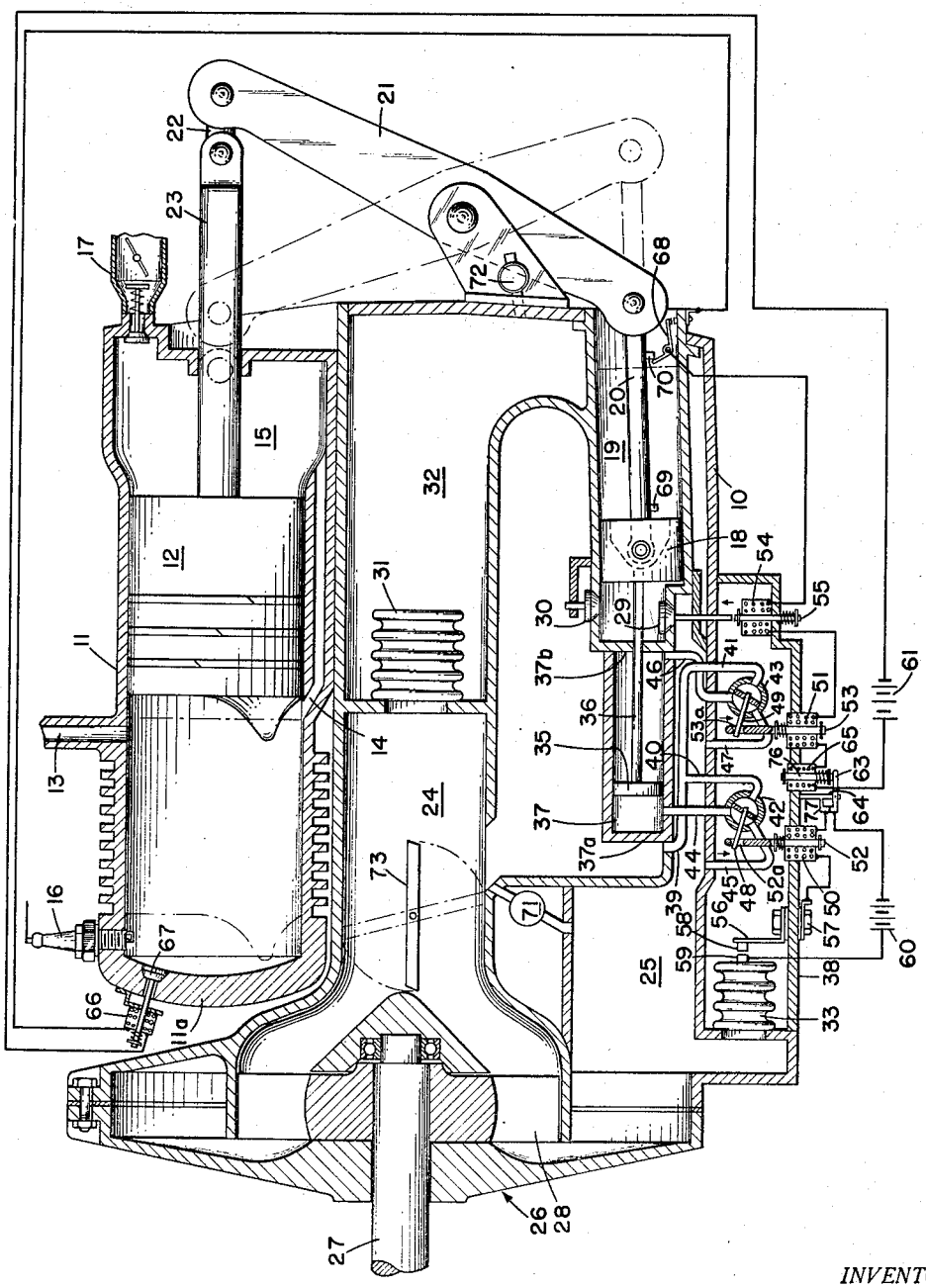
INVENTOR.
COOPER B. BRIGHT
BY
ATTORNEYS Patented Dec. 8, 1953

2,661,592

UNITED STATES PATENT OFFICE 2,661,592

HYDRAULIC DRIVE INTERNAL-COMBUSTION ENGINE

Cooper B. Bright, United States Navy

Application September 17, 1951, Serial No. 247,013

12 Claims. (Cl. 60—18)

(Granted under Title 35, U. S. Code (1952), sec. 266)

This invention relates to power plants of general utility and particularly to those of the type in which intermittent energy of an expansible gas is transformed into useful work at a desired rate. Briefly, the system comprises an expansible gas engine operating at maximum efficiency on any predetermined cycle, a fluid pump driven by the engine, an accumulator for receiving the fluid under pressure, a motor driven by the high pressure fluid, and suitable means for automatically starting the engine or operating it during the non-working portion of its cycle of operation.

An object of the invention is the provision of a power plant, which intermittently receives energy in one portion thereof and either stores this energy for subsequent use in the form of potential energy of a fluid under pressure, or transforms the intermittent energy into useful work at a constant or other desired rate.

Another object is the provision of a power plant which includes a fluid motor for doing work at a desired rate coordinated with a reciprocating engine in such manner that the engine automatically supplies the motor with energy in accordance with the power requirements thereof by varying the frequency of its power strokes without substantially altering the speed or power of each stroke.

Another object is the provision of a power plant which has a motor capable of delivering full torque when starting, coordinated with a combustion engine for driving same which automatically starts simultaneously with the motor.

Still another object of the present invention is the provision of a reciprocating engine, which, on its work stroke, drives a pump for placing a fluid in a reservoir under pressure, and utilizing a portion of said reservoir fluid for operating said pump so as to drive said engine on its non-work stroke.

A further object is to furnish a power plant as described in the paragraph above wherein a portion of said reservoir fluid is utilized to drive said engine on its suction stroke in the event a work stroke does not occur due to a mis-fire.

A still further object is the provision of electrically operated valve and switch means for automatically metering the reservoir fluid to said pump to meet the requirements of a fluid motor operated by said reservoir fluid. The valve and switch means also automatically meters the fluid to operate said reciprocating engine during normal operation or when a mis-fire occurs.

Further objects are the provision of a power plant which has a minimum number of parts all of which are readily accessible, has high power output per unit of weight, is subject to a wide variation of arrangements of its component parts, and has inherent cushioning features for the expanding forces of a gas.

Still further objects, advantages, and salient features will become apparent from a consideration of the description to follow, the accompanying drawing, and the appended claims.

This application is a continuation-in-part of my Serial No. 668,054, filed May 8, 1946, now Patent No. 2,601,756, for Combined Fluid Motor and Expansible Gas Engine.

The single figure of the drawing shows a side view, partly in section of the device embodying my invention.

Referring to the drawing, a generally cylindrical support 10 for the various parts of the device is recessed at the top for the reception of an expansible gas prime mover, shown in the form of an air-cooled, two-cycle internal combustion engine cylinder 11 having a conventional cylinder head 11a, piston 12, exhaust port 13, intake port 14, compression chamber 15, spark plug 16 and carburetor connection 17. To promote clearness in the drawings, the ignition system including batteries, coils, contact points, etc., are not shown, but it will be understood that any conventional system which would effect ignition at a predetermined point in the travel of piston 12 could be employed. The carburetor, also not shown, could be of any conventional type.

On the opposite side, and within the confines of support 10, is located a liquid pump illustrated as a piston 18 reciprocable in a cylinder 19. This piston is operably connected to piston 12 by means of connecting rod 20, bell crank 21, link 22 and piston rod 23.

A high-pressure liquid reservoir 24 and a low-pressure liquid reservoir 25 are provided within support 10 and in communication with these reservoirs at one end of the support is a reversible liquid turbine, indicated generally by the numeral 26, constructed to operate from the liquid in reservoir 24 and thus drive shaft 27 to which may be coupled any sort of power driven device. The turbine is of the type wherein the delivered power is determined by the amount of liquid flow therethrough, which in turn is determined by the setting of turbine blades 28 or by valve means 73. The liquid after passing through the turbine enters low-pressure reservoir 25 and is then returned to high-pressure reservoir 24 by piston 18 through suitable check valves 29 and 30. A flexible diaphragm, shown in the form of a bellows 31 forms a part of reservoir 24 and expands against air under pressure in air tank 32. The bellows accommodates any liquid which is not directed into turbine 26 and also acts as a means by which a part or all of the intermittent energy imparted to the liquid in reservoir 24 may be stored for subsequent use. The volume of air in tank 32 should be sufficient to ensure as little fluctuation of pressure as possible so that the liquid in reservoir 24 remains under substantially constant pressure regardless of its change in volume. This is desired to provide a smooth flow of power from the turbine. Bellows 31 also serves the purpose of dividing the air and liquid into separate compartments and hence eliminates emulsification of the liquid or the entrainment of air bubbles therein, which are both objectionable. It is necessary that the low pressure reservoir 25 be of variable volume, also, to accommodate any excess liquid delivered thereto by turbine 26 and which is not directed immediately to pump piston 18, and to this end a bellows 33 is provided in a wall of reservoir 25. This bellows is urged in one direction by atmospheric pressure so that the liquid received in reservoir 25 will always be sufficient to meet the requirements of pump piston 18.

It is apparent that since no flywheel is employed to return piston 12 to the end of its compression stroke for a subsequent power stroke, some means are necessary to perform this function, and to this end a plunger 35, attached to piston 18 by connecting rod 36 and extending into cylinder 37, is provided. By supplying fluid under pressure from reservoir 24 to end 37a of cylinder 37, plunger 35 and piston 18 are moved unidirectionally in their respective cylinders. Thus, piston 12 is moved through members 21, 22 and 23 toward cylinder head 11a in a manner to compress the fuel mixture therein. At an appropriate time spark plug 16 fires and piston 12 begins its power stroke. Plunger 35 is also utilized when piston 12 is moved into position for ignition of the compressed fuel mixture and a mis-fire occurs. Thus, by supplying fluid under pressure from reservoir 24 to the end of cylinder 37, illustrated by numeral 37b, plunger 35 and piston 18 are moved inwardly of the cylinders 37 and 19 respectively, and piston 12 is moved outwardly of the cylinder 11. To carry out the above operations I provide a system of fluid lines and electric solenoid valves which will now be described in detail.

A housing, illustrated by the numeral 38, is provided beneath support 10 and is adapted to furnish a means for mounting the above-mentioned system.

A fluid line 39 is arranged to communicate with high-pressure reservoir 24 adjacent the end of cylinder 37 and directs fluid through fluid lines 40 and 41 to three-way valves 42 and 43, respectively. Three-way valve 42 has a fluid line 44 which communicates with end 37a and a fluid line 45 which communicates with low-pressure reservoir 25. Three-way valve 43 communicates with end 37b through fluid line 46 and with low-pressure reservoir 25 through fluid line 47. Control arms 48 and 49 are provided for three-way valves 42 and 43, respectively. It will be seen that by proper manipulation of the valve control arms high-pressure fluid can enter either end of cylinder 37 and by further manipulation the fluid is permitted to leave said cylinder and enter the low-pressure reservoir.

Manipulation of the control arms is furnished by solenoids and switches adapted to function upon the occurrence of certain conditions. Thus, solenoids 50 and 51 are mounted in housing 38 adjacent valves 42 and 43, respectively. Solenoids 50 and 51 are conventional and are furnished with core plungers 52 and 53, respectively, for operating valve control arms 48 and 49, respectively. Plunger 52 has a slot 52a fashioned in the upper end thereof adapted to receive the end of control arm 48 therein. A similar slot 53a is formed in plunger 53 for receiving the end of control arm 49.

Valve 29 is provided to operate freely during normal operation so that it will be closed during the delivery stroke of piston 18 and open during the return stroke. Upon certain conditions it may become necessary to have this valve open during the delivery stroke. To effect the opening of the valve 29, a solenoid 54 is mounted on housing 38 below the valve, and includes a plunger 55. The plunger is arranged to open the valve when the solenoid is energized. A pivoted lever 63 is mounted on a standard 64. One end of the lever is controlled by a solenoid 65 through plunger 76. The other end of the lever is adapted to normally engage a contact point 77. When solenoid 65 is energized the engagement is broken thus opening the circuit to de-energize solenoid 50. A solenoid 66 is adapted to actuate a valve 67 in piston head 11a when energized.

The circuit furnished for energizing the various solenoids will now be described in detail. A switch 56 is located adjacent the end of bellows 33 and is secured to housing 38 by bolt and nut means 57. This switch is in the form of a leaf spring and has a contact point 58 adapted to engage a similar contact point 59 on bellows 33 when the latter expands a predetermined amount. Battery 60 is connected by suitable electrical conductors to switch 56, the circuit breaking lever 63 and solenoid 50. When switch 56 is closed the solenoid will be energized causing control arm 48 to position valve 42 so that fluid will flow through lines 40 and 44. As stated above, the circuit breaking lever 63 is normally positioned to engage contact point 77 when solenoid 65 is de-energized. Battery 61 is connected to operate solenoids 51, 54, 65 and 66, the circuit being normally broken by a switch 68.

The normal operating cycle of the apparatus will now be described. With pistons 12 and 18 in the positions shown in solid lines in the figure, the bellows 33 will be expanded in order to accommodate the fluid in reservoir 25 and to ensure adequate fluid to fill cylinder 19 when piston 18 is withdrawn. When the bellows is expanded contact 59 engages contact 58 and solenoid 50 is energized by battery 60. Thus, plunger 52 is pulled downwardly causing valve 42 to be positioned so that fluid flows from the high pressure reservoir 24 into cylinder 37 adjacent the end 37a. The liquid forces piston 18 outwardly of the cylinder 19, and in so doing causes piston 12 to compress the fuel mixture in cylinder 11. As piston 18 moves outwardy valve 30 closes and valve 29 is opened permitting fluid to be drawn into cylinder 19 from the low-pressure reservoir. During this normal operation valve 43 is positioned to permit the flow of fluid from cylinder 37 to the low-pressure reservoir 25. When piston 12 has moved towards head 11a a pre-determined amount, the sparkplug will ignite the fuel mixture causing a delivery stroke of piston 18. Thus valve 29 is closed and fluid is delivered under pressure through valve 30 into high-pressure reservoir 24. In this manner the operation of the internal combustion engine is not dependent upon the use of a conventional flywheel and is not handicapped by the inherent disadvantages of heavy and cumbersome inertia parts. Further, it is not required that the engine be in continuous operation as in the case of a flywheel; that is, energy can be stored in reservoir 24 and later used to recharge the engine when it becomes necessary, rather than continuously re-charge same as would result if a flywheel were used. It becomes apparent, accordingly, that as the power requirements of shaft 27 vary, cylinder 11 supplies these power requirements by varying its rate of operation and hence the amount of liquid circulated through the system previously described. While piston 18 delivers energy to reservoir 24 intermittently, turbine 26 delivers power at a uniform or other desired rate since the pressure in 24 remains constant due to bellows 31 and air tank 32.

In event that no power is desired at shaft 27, stopping and starting of the system is automatic which is summarized as follows, it being assumed that the turbine blades are closed to preclude liquid flow therethrough: Liquid in the high pressure reservoir tends to move plunger 35 outwardly of the cylinder 37 as before described, but since the turbine is not discharging liquid into low-pressure reservoir 25, piston 18 tends to create a partial vacuum in reservoir 25 which will restrain outward movement of piston 18 since atmospheric pressure acts on the outer side thereof. Thus bellows 33 contracts causing the loss of contact between points 58 and 59. Solenoid 50 is de-energized and valve 42 is returned to a position where fluid from chamber 37 flows to the low-pressure reservoir. Thus, the entire system stops automatically. When the turbine blades are again opened to resume operation, liquid again flows through the turbine and into reservoir 25 and cylinder 19. The partial vacuum therefore no longer exists which permits bellows 33 to expand until contact 59 engages contact 58, thus energizing solenoid 50. Valve 42 is positioned to supply fluid from the high-pressure reservoir to cylinder 37 causing plunger 35 to again force piston 12 to the end of its compression stroke as explained under normal operation.

From the foregoing it is apparent that under conditions where the power output of turbine 26 remains substantially constant, piston 12 will automatically operate on a conventional two-stroke Otto cycle; however, under certain conditions, for example, when a mis-fire occurs by reason of faulty ignition, or where the mixture in the power cylinder has condensed because the system has been shut down, it becomes necessary to condition the engine for a subsequent power stroke. It will be noted that in the event of a mis-fire plunger 35 will move piston 12 closer to cylinder head 11a. Therefore it is necessary to return pistons 12 and 18 to the positions shown in solid lines in the drawing. To accomplish this a lug 69 is positioned on connecting rod 20 adjacent piston 18 and is adapted to contact switch 68 in a manner to close the circuit in which battery 61 is located. Thus, solenoids 65, 51, 54 and 66 are energized.

Solenoid 65 operates to open the circuit in which battery 60 is located and de-energizes solenoid 50. Valve 42 is positioned to permit fluid to flow from cylinder 37 through lines 44 and 45 into reservoir 25. When solenoid 51 is energized valve 43 is positioned to permit fluid to flow from reservoir 24 through lines 46 and 41 into cylinder 37. Solenoid 54 urges valve 29 open permitting fluid to flow from cylinder 19 back into reservoir 25. Solenoid 66 moves valve 67 inwardly permitting the compressed gases in cylinder 11 to flow through head 11a. The fluid flowing through line 46 into cylinder 37 moves plunger 35 toward cylinder end 37a, forcing the fluid between the plunger and said cylinder end into reservoir 25. Valve 67 has been provided to prevent the pulling of a vacuum in the combustion chamber in the event the compressed gases leak past the piston into chamber 15.

When the suction stroke of piston 12 is completed lug 70 on rod 20 contacts switch 68 and opens the circuit. Thus solenoids 65, 51, 54 and 66 are de-energized and the elements which they operate return to their normal position. Therefore, the compression cycle begins and the engine is again ready for normal operation.

In the event that reservoirs 24 and 25 become substantially equal in pressure due to the running of the turbine when the expansible gas engine is not in operation, starting of said engine may be effected by using a pump 71, driven by suitable power means such as an electric motor to transfer liquid from reservoir 25 to reservoir 24 and thus establish sufficient reserve energy in reservoir 24 to start the device in the normal manner previously described.

The various parts of the device would, in perhaps most cases, be so designed and proportioned relative to one another to give optimum overall efficiency and in this connection, it should be observed that if a certain air pressure in tank 32 is chosen and also a fixed throttle setting in the carburetor, the engine will always operate on substantially the same thermodynamic cycle, and variations in power requirements of the turbine will change only the rate of such cycle; that is, for example, an increase in power requirements automatically effects more power strokes per unit of time by the engine, but its actual thermodynamic cycle remains substantially unchanged. The conventional engine, on the other hand, varies its thermodynamic cycle under change of load, and usually at full load the cycle is least efficient thermally, the advantages over this type of engine therefore become readily apparent since in this invention an optimum efficient thermodynamic cycle can be chosen which will remain the same under variation of load.

In some cases it may be desired to change the potential power output of the system, either by loading it over a designed optimum load or decreasing its loading from a designed optimum loading. The thermodynamic cycle attendent with such changes can be chosen in a simple manner by this invention. If a higher output is desired, for example, a greater air pressure is employed in air tank 32 by admitting air through valve 72. This, in turn, calls for a higher output by piston 12 so that the carburetor throttle is merely opened in accordance with the increased power requirements. Similarly, if it is desired to reduce the potential power output, the air pressure is decreased and the throttle valve closed somewhat from its normal designed position.

While the previous description sets forth the expedience of the invention as a means to obtain uniform power from an intermittent power source, and especially one having a minimum number of working cylinders, it is to be observed that the device has equal application to installations where intermittent power is desired. The reserve energy in reservoir 24 is instantly available for requirements of the turbine whether they be continuous, variable, or intermittent power, it only being necessary to adjust the turbine blades 28 or valve means 73 in accordance with the power needs of shaft 27, and the remainder of the system automatically supplies these requirements.

It is apparent that while the invention has been described in detail, this is intended only for purposes of teaching the principles of the invention rather than as a limitation thereon. The engine, for example, has been described as a two-cycle, air-cooled Otto type, but it is apparent that it could be liquid cooled or operated on other cycles such as the diesel cycle wherein a fuel injector would be substituted for a spark plug and ignition would take place as a result of the heat of compression.

Further, the device, while disclosed as a system in which power is delivered to a shaft, could well function as a pumping device by merely eliminating the turbine and incorporating the remainder of the device in a fluid system which requires for its operation the movement of a liquid at a continuous rate, a variable rate, or an intermittent rate in either a closed or open circuit. Thus, as a pump means in a closed circuit, the invention could be employed with any device which requires for its operation a flow of liquid under differential pressure; in an open circuit, it could receive liquid from any source of supply and deliver a column of liquid to effect useful work. As an example of the latter, the invention could be employed for hydropropulsion.

It is accordingly intended that the claims to follow should be construed in terms of the broad teachings above set forth and not as limited to the exact embodiments illustrated.

The invention described herein may be manufactured and used by or for the Government of the United States of America for governmental purposes without the payment of any royalties thereon or therefor.

I claim:

1. A power plant comprising an engine having a power stroke and a compression stroke, a closed fluid system having a low-pressure chamber and a high-pressure chamber, pump means connected to said engine for driving said fluid from the low-pressure chamber to the high-pressure chamber, said pump means being operated on its delivery stroke by said engine on its power stroke and means operable by said high-pressure fluid for repeatedly driving said engine during its compression stroke, said means including a cylinder having a plunger slidably mounted therein, said plunger being operatively connected to said pump means for movement therewith, and conduit means connecting one end of said cylinder with said high-pressure chamber.

2. A power plant comprising an engine having a power stroke and a compression stroke, a closed fluid system having a low-pressure chamber and a high-pressure chamber, pump means connected to said engine for driving said fluid from the low-pressure chamber to the high-pressure chamber, said pump means being operated on its delivery stroke by said engine on its power stroke and means operable by said high-pressure fluid for driving said engine during its compression strokes, said means including a cylinder, a piston slidably mounted in said cylinder and operatively connected to said pump means, conduit means connecting one end of said cylinder with said high-pressure chamber, and valve means actuable upon a pre-determined pressure in said low-pressure chamber for controlling the flow of fluid through said conduit means.

3. A power plant comprising an engine having a power stroke and a compression stroke, a fluid circuit having a low-pressure chamber and a high-pressure chamber, pump means connected to said engine for driving said fluid from the low-pressure chamber to the high-pressure chamber, said pump means being operated on its delivery stroke by said engine on its power stroke and means operable by said high-pressure fluid for repeatedly driving said engine during its compression stroke, said means including a cylinder, a piston slidably mounted in said cylinder and operatively connected to said pump means, conduit means connecting one end of said cylinder with said high-pressure chamber, and valve means mounted in said conduit means for controlling the flow of fluid therethrough.

4. A power plant comprising an engine having a power stroke and a compression stroke, a fluid system comprising a circuit having a low-pressure chamber and a high-pressure chamber, pump means connected to said engine for driving said fluid from the low-pressure chamber to the high-pressure chamber, said pump means being operated on its delivery stroke by said engine on its power stroke, variable volume accumulator means connected to said low-pressure chamber, and means operable by said high-pressure fluid for driving said engine during its compression stroke, said means including a cylinder, a piston slidably mounted in said cylinder and operatively connected to said pump means, conduit means connecting one end of said cylinder with said high-pressure chamber, and valve means mounted in said conduit means actuable upon a pre-determined volume of said accumulator means for controlling the flow of fluid through said conduit means.

5. A power plant comprising a reciprocating engine having a work stroke and a non-work stroke, a closed fluid system having a low-pressure chamber and a high-pressure chamber, a reciprocating pump connected to and driven by said engine, said pump being connected in said fluid system for driving said fluid from the low pressure chamber to the high-pressure chamber on the work stroke of said engine, and means operable by the fluid in said high-pressure chamber for repeatedly driving said engine during its non-work stroke, said means including a cylinder mounted adjacent one end of said reciprocating pump, a plunger slidably mounted in said cylinder and connected to said pump for movement therewith, and conduit means connecting one end of said cylinder with said high-pressure chamber.

6. A power plant comprising a reciprocating engine having a work stroke and a non-work stroke, a fluid system having a low-pressure chamber and a high-pressure chamber, a reciprocating pump connected to and driven by said engine, said pump being connected in said fluid system for driving said fluid from the low pressure chamber to the high-pressure chamber, said pump means being operated on its delivery stroke by said engine on its power stroke, variable volume accumulator means connected to said low-pressure chamber, and means operable by the fluid in said high-pressure chamber for driving said engine during its non-work strokes, said means including a cylinder mounted adjacent one end of said reciprocating pump, a plunger slidably mounted in said cylinder and connected to said pump for movement therewith, conduit means connecting one end of said cylinder with said high pressure chamber, and valve means actuable upon a pre-determined volume in said accumulator means for controlling the flow of fluid through said conduit means.

7. A power plant comprising an engine having a power stroke and a compression stroke, a fluid circuit having a low-pressure chamber and a high-pressure chamber, pump means connected to said engine for driving said fluid from the low-pressure chamber to the high-pressure chamber on the power stroke of said engine, and means operable by said high-pressure fluid for driving said engine on its power stroke in the event of a mis-fire and on its compression stroke during normal operation, said means including a cylinder, a plunger slidably mounted in said cylinder and operatively connected to said pump for movement therewith, conduit means connecting each end of said cylinder with said high-pressure chamber and said low-pressure chamber, valve means in said conduit means leading to each end of said cylinder, the valve means leading to one end of said cylinder being normally positioned to flow fluid between the high-pressure chamber and said one end, the valve means leading to the other end of said cylinder being normally positioned to flow fluid between the low-pressure chamber and said other end, and means actuable upon the occurrence of a mis-fire in said engine for reversing the positions of said valves.

8. A power plant comprising a reciprocating engine having a work stroke and a non-work stroke, a fluid circuit having a low-pressure chamber and a high-pressure chamber, a reciprocating pump connected to and driven by said engine, said pump being connected in said fluid circuit for driving said fluid from the low-pressure chamber to the high-pressure chamber on the work stroke of said engine, and means operable by said high-pressure fluid for repeatedly driving said reciprocating engine on its work stroke in the event of a mis-fire and on its non-work stroke during normal operation, said means including a cylinder having a plunger slidably mounted therein, rod means connecting said plunger to said reciprocating pump for movement therewith, conduit means connecting said high and low-pressure chambers to each end of said cylinder, valve means in said conduit means for normally flowing fluid between one end of said cylinder and the high-pressure chamber and the other end of said cylinder and the low-pressure chamber, and means actuable upon the occurrence of a mis-fire in said engine for reversing the positions of said valve means.

9. A power plant comprising a reciprocating engine having a work stroke and a non-work stroke, a fluid system having a low-pressure chamber and a high-pressure chamber, a reciprocating pump connected to and driven by said engine, said pump being connected in said fluid circuit for driving said fluid from the low-pressure chamber to the high-pressure chamber on the work stroke of said engine, and means operable by said high-pressure fluid for driving said reciprocating engine on its work stroke in the event of a mis-fire and on its non-work stroke during normal operation, said means including a cylinder having a plunger slidably mounted therein, rod means connecting said plunger to said reciprocating pump for movement therewith, conduit means connecting said high and low-pressure chambers to each end of said cylinder, valve means in said conduit means for normally flowing fluid between one end of said cylinder and the high-pressure chamber and the other end of said cylinder and the low-pressure chamber, and means actuable upon the occurrence of a mis-fire in said engine for reversing the positions of said valve means, said last-named means including a plurality of solenoids actuated by the movement of said reciprocating pump beyond a pre-determined point of travel.

10. A power plant comprising an engine having a power stroke and a compression stroke, a fluid circuit having a low-pressure chamber and a high-pressure chamber, pump means connected to said engine for driving said fluid from the low-pressure chamber to the high-pressure chamber on the power stroke of said engine, variable volume accumulator means mounted in communication with said low-pressure chamber, means operable by said high-pressure fluid for driving said engine on its compression stroke, said means including a cylinder, a piston slidably mounted in said cylinder and operatively connected to said pump means, conduit means connecting one end of said cylinder with said high-pressure chamber, and said low-pressure chamber, and valve means mounted in said conduit means actuable upon a pre-determined volume in said accumulator means for normally flowing fluid between said high-pressure chamber and said one end, a second means for driving said engine on its work stroke in the event of a mis-fire of said engine, said second means including a second conduit means for flowing fluid between the other end of said cylinder and said high and low-pressure chambers, a second valve means for normally flowing fluid between said low-pressure chamber and said other end, and valve control means actuated by the occurrence of a mis-fire in said engine for positioning said first-mentioned valve means to flow fluid between said one end and said low-pressure chamber and positioning said second-mentioned valve means to flow fluid between said other end and said high-pressure chamber.

11. In a power plant including an engine having a power stroke and a compression stroke, a closed fluid circuit having a high-pressure reservoir and a low-pressure reservoir, said reservoirs comprising expansible chambers, pump means connected to said engine for driving said fluid to the high-pressure reservoir from the low-pressure reservoir on the power stroke of said engine, and means operable by said fluid on the high-pressure reservoir for operating said engine during its compression stroke; wherein the last-named means comprises a double acting plunger connected to said pump means, conduit means connecting said high and low-pressure reservoirs to each side of said plunger, valve means for normally flowing fluid between said high-pressure reservoir and one side of said plunger and between the low-pressure reservoir and the other side of said plunger so that said plunger is moved in one direction by the high-pressure fluid, and means operable upon the occurrence of a mis-fire in said engine for reversing the connections between the reservoirs and each side of the plunger so that the plunger is moved in an opposite direction.

12. In a power plant including an engine having a power stroke and a compression stroke, a closed fluid circuit having a high-pressure reservoir and a low-pressure reservoir, pump means connected to said engine for driving said fluid to the high-pressure reservoir from the low-pressure reservoir on the power stroke of said engine, and means operable by said fluid in the high-pressure reservoir for operating said engine during its compression stroke; wherein the last-named means comprises a double acting plunger connected to said pump means, conduit means connecting said high and low-pressure reservoirs to each side of said plunger, valve means for normally flowing fluid between said high-pressure reservoir and one side of said plunger and between the low-pressure reservoir and the other side of said plunger so that said plunger is moved in one direction by the high-pressure fluid, and means operable upon the occurrence of a mis-fire in said engine for reversing the connections between the reservoirs and each side of the plunger so that the plunger is moved in an opposite direction, said last-named means including a plurality of solenoids, a source of power supply, a normally open switch connected to said power supply and said solenoids, and lug means on said pump for operating said switch when said mis-fire occurs.

COOPER B. BRIGHT.

References Cited in the file of this patent
UNITED STATES PATENTS

| Number | Name | Date |
|---|---|---|
| 1,931,164 | Lanning | Oct. 17, 1933 |
| 2,303,795 | Poetker | Dec. 1, 1942 |
| 2,391,972 | Hufford et al. | Jan. 1, 1946 |